United States Patent Office 2,920,092
Patented Jan. 5, 1960

2,920,092

GAMMA, GAMMA-DIETHOXYPROPYL- AND BETA - FORMYLETHYL - BIS(TRIMETHYL-SILOXY)METHYLSILANES

Donald L. Bailey, Snyder, N.Y., assignor to Union Carbide Corporation, a corporation of New York No Drawing. Application December 17, 1957
Serial No. 703,248

3 Claims. (Cl. 260—448.2)

This invention relates to novel organosilicon compounds. More particularly, the invention contemplates the provision of the specific organosilicon compounds, (1) gamma, gamma-diethoxypropyl-bis(trimethylsiloxy)-methylsilane, and (2) (beta-formylethyl-bis(trimethylsiloxy)methylsilane, as represented by the following respective structural formulae:

(1)
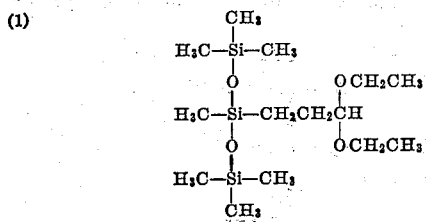

and (2)
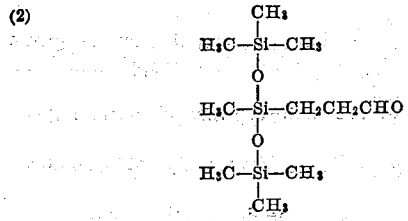

The invention is based on my discovery that the foregoing siloxane structures can be synthesized by the thermal addition of heptamethyltrisiloxane to acrolein acetal in the presence of a platinum catalyst to yield the acetal adduct (1), followed by the acid-catalyzed hydrolysis of this compound to yield the aldehyde-functional derivative (2). In essence, the total synthesis involves conversion of acrolein to the acetal by reaction with ethyl orthoformate, as represented by the equation:

(I)

$$CH_2=CHCHO + HC(OC_2H_5)_3 \rightarrow$$
$$CH_2=CHCH(OC_2H_5) + HCOOC_2H_5$$

followed by the formation of a reaction mixture comprising the acrolein acetal, heptamethyltrisiloxane, and a small amount of a platinum catalyst. The reaction mixture is then heated to cause the components to react under influence of the platinum catalyst to effect decomposition of the silanic hydrogen bond of the siloxane and addition of the resulting silyl and hydrogen free radicals to respective carbon atoms of the carbon to carbon multiple bond of the acetal derivative of the unsaturated aldehyde, with the production of the acetal adduct, as represented by the equation:

(II)
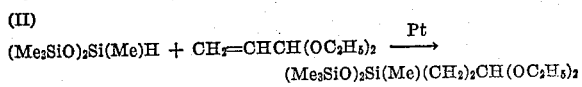

The starting material heptamethyltrisiloxane employed in synthesizing the novel compounds of my invention may be produced by any one of several conventional procedures. Thus, it can be produced, for example, by the sulfuric acid catalyzed rearrangement of methylhydrogenpolysiloxane $[(MeSiHO)_x]$ with hexamethyldisiloxane $[Me_3SiOSiMe_3]$ as an endblocker. This equilibration may be accomplished by simply stirring the reactants at room temperature (25° C.) for a period of from four to eight hours in the presence of from 0.5 to 1 percent by weight of sulfuric acid, followed by suitable known measures for effecting catalyst removal.

The plantium catalyst used in promoting addition of the heptamethyltrisiloxane to the acrolein acetal, is preferably employed in finely-divided form, either alone, or in combination with an inert support such as charcoal, and the like, or in the form of a multicomponent or heterogeneous catalyst consisting of platinum deposited on the gamma-allotrope of alumina (platinum-on-gamma-alumina).

It is found that the relative concentration of platinum employed for catalyzing the addition reaction (Equation II) is not overly critical, but rather, concentrations of the elemental metal ranging from 0.001 part to about 5 parts by weight of the reactants can be employed and satisfactory results are obtained. In actual practice employing the metal in the form of the heterogeneous catalyst, platinum-on-gamma-alumina, I have found that concentrations of the order of one to two percent by weight of the heterogeneous substance, containing one to two percent by weight of elemental platinum, function admirably for the purpose intended.

In general, the reaction time and temperature of reaction for the production of the addition adduct are also relatively non-critical, and the reaction can be brought to completion with high yields of the adduct by heating the reactants at temperatures within the range 80–180° C. for periods ranging from about one to three hours. In actual practice, I prefer to operate at temperatures within the range 130–140° C. It is relatively essential, however, to effect stirring or agitation of the reaction mixture throughout the time of treatment in order to establish and maintain uniform dispersion of the solid catalyst within the liquid reaction phase.

It is interesting to note that the thermal addition of heptamethyltrisiloxane to unsaturated organic aldehydes such as acrolein, per se, or crotonaldehyde, results in formation of 1,4-addition adducts to the carbonyl group rather than the expected adducts formed by addition to the carbon-carbon double bond. This mechanism is represented by the following skeletal equation:

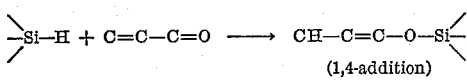
(1,4-addition)

Compounds of the foregoing general type are described and claimed in my copending U.S. application Serial No. 703,254 which was filed of even date with this application.

The presence of the polar groups within the compounds of the invention render them extremely useful as modifiers for silicone materials such as oils and elastomers, as well as for thermosetting resins. Thus, the polar groups make the compounds useful for modifying silicone rubbers or thermosetting resins to contribute greater strength, greater cohesive and adhesive forces in bonding to other materials, greater solvent resistance, etc. In addition, these groups permit utilization of the compounds to impart greater lubricity to silicone oils. The compounds, per se, are useful as silicone oils, and may be employed, also, to introduce their respective functional organic groups into siloxanes, in general, by conventional equilibration techniques. The acetal and aldehyde groups undergo all of the usual organic reactions for such groups, and the compounds may be employed, for example, as ingredients for copolymers with phenolic, melamine, or urea resins.

It is believed that the invention may be best understood by reference to the following specific examples describing the foregoing principles and procedures as applied to the production of the novel compounds of the invention:

EXAMPLE I

Preparation of gamma, gamma-diethoxypropyl-bis(trimethylsiloxy)methylsilane
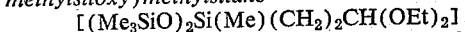
by addition of heptamethyltrisiloxane to acrolein acetal Into a one-liter, three-necked flask equipped with stirrer, reflux condenser and thermometer, there were placed 222 grams (1 mole) of heptamethyltrisiloxane, 75 grams (0.58 mole) of acrolein acetal, and 1.5 grams, (0.8 wt. percent) of one percent platinum-on-gamma-alumina catalyst. The reaction mixture was heated with stirring at 130–140° C. At 140° C. an exothermic reaction ensued and it became necessary to remove heat from the flask. After a few minutes, the reaction subsided and heating was continued at 145° C. for one-half hour. Following this heating period, the flask and its contents were cooled to room temperature and the catalyst was removed by filtering. Upon distillation of the products, there was obtained 120 grams of low boilers, 8 grams of residues, and 146 grams of the desired adduct. The compound yielded the following physical and analytical data:

Boiling point _____ 88–92° C./0.7 mm. Hg.
Refractive index ($n_D^{25}$) _____ 1.4085.

|  | Percent C | Percent Si | Percent H |
|---|---|---|---|
| Found | 50.1 | 22.9 | 11.3 |
| Theoretical | 45.0 | 23.8 | 10.0 |

EXAMPLE II

Preparation of beta-formylethyl-bis(trimethylsiloxy)-methylsilane [(Me₃SiO)₂Si(Me)(CH₂)₂CHO] by hydrolysis of the heptamethyltrisiloxane acrolein acetal adduct of Example I Into a 250 cubic centimeter flask equipped with a reflux condenser, there were placed 39.9 grams (0.11 mole) of the acrolein acetal adduct of heptamethyltrisiloxane, 45 grams of tetrahydrofuran as solvent, and 10 cubic centimeters of a one percent aqueous solution of hydrogen chloride. The mixture was refluxed for 6 hours at 75° C. Following this treatment, the products were neutralized with aqueous sodium bicarbonate, desolvated and distilled under reduced pressure through a Vigreaux column. From the distillation, there were obtained 5 grams of the desired silicon aldehyde, and 16 grams of high boiling products. The adduct yielded the following physical and analytical data:

Boiling point _____ 58–60° C./0.5 mm.
Refractive index ($n_D^{25}$) _____ 1.4085.

|  | Percent C | Percent Si | Percent H |
|---|---|---|---|
| Found | 43.1 | 28.4 | 9.6 |
| Theoretical | 43.1 | 30.1 | 9.3 |

The 2,4-dinitrophenylhydrazone derivative of the aldehyde had a melting point of 73–75° C. The 2,4-dinitrophenylhydrazone prepared directly from the acrolein acetal-heptamethyltrisiloxane adduct, melted at 73–74° C. and contained 13.5% Si (theory, Si=17.9%).

Having thus described the subject matter of my invention, what it is desired to secure by Letters Patent is:

1. An organofunctional siloxane represented by the formula:

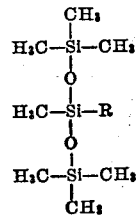

wherein R represents a member selected from the group consisting of gamma, gamma-diethoxypropyl and beta-formylethyl radicals.

2. Gamma, gamma-diethoxypropyl-bis(trimethylsiloxy)methylsilane.

3. Beta-formylethyl-bis(trimethylsiloxy)methylsilane.

References Cited in the file of this patent
UNITED STATES PATENTS

| 2,588,083 | Burkhard et al. | Mar. 4, 1952 |
| 2,803,637 | Speier | Aug. 20, 1957 |

UNITED STATES PATENT OFFICE
CERTIFICATE OF CORRECTION

Patent No. 2,920,092

January 5, 1960

Donald L. Bailey

It is hereby certified that error appears in the printed specification of the above numbered patent requiring correction and that the said Letters Patent should read as corrected below.

Column 3, line 32, for "1.4085" read -- 1.4077 --.

Signed and sealed this 31st day of January 1961.

(SEAL)
Attest:

KARL H. AXLINE
Attesting Officer

ROBERT C. WATSON
Commissioner of Patents